United States Patent Office 2,774,681
Patented Dec. 18, 1956

2,774,681

PROCESS OF COATING METAL WITH MICA AND ARTICLE

Paul Huppert, Plainfield, and Arthur F. Jakubczak, Perth Amboy, N. J., assignors to General Ceramics Corporation, a corporation of Delaware No Drawing. Application October 19, 1953, Serial No. 387,050

4 Claims. (Cl. 117—33)

This invention relates to a ceramic coating having improved high temperature resistance due to the presence of a highly reflective mica component and to metal parts including such coatings.

Ceramic coating for protecting metals subjected to high temperatures are being developed and assuming very great importance in the arts where high temperature resistance is a requirement.

Among the objects of the present invention is to provide a product with a coating which has greater reflectivity and improved temperature resistance and a process for making such product.

This invention is based on the discovery that mica may be incorporated into or over ordinary temperature resistant coatings to materially improve the reflectivity, and thus the temperature resistance of the coating and also to increase the thermal endurance of the article.

Various grades and kinds of mica may be employed in the process. Any of the mica species may be used, for example, phlogopite and lepidolite are very satisfactory. The mica may be in the form of relatively large flakes or may be ground (either by wet or dry grinding, for example). Micronized mica which is finer than 500 mesh has been employed satisfactorily in the process.

The mica is included in the coating by (1) mixing mica with the slip of the coating composition before applying the slip to the metal and curing it, (2) grinding mica with the components which are to make up the slip, (3) sprinkling mica onto an article to which slip has been applied and at least partially dried but before ceramically curing the coating, (4) applying a separate mica-containing slip over the once coated products, (5) by using low melting glasses or enamels as bonding agents.

(a) By mixing same with the mica and/or
(b) By applying an intermediary coating between the basic high temperature resisting coating and the layer of mica and
(c) By combining both these methods.

The mica coating may also be covered with a protecting layer of glass or with additional layers of mica and low melting glasses.

The high temperature resistant coatings to which the mica is added or over which the mica layer is formed comprise any of the commercially available or known coating compositions. Many such coatings comprise chromic oxide as an essential ingredient. It has also been found that by replacing all or a part of the chromic oxide in such coatings with titanium or zirconium oxide the products which include the mica products have improved properties. The combination titanium or zirconium oxide with mica produces exceptional reflection characteristics which show up in unexpectedly improved high temperature resistance. The U. S. Bureau of Standards has been successful in developing a number of high temperature resistant ceramic coatings which may be employed as a basic coating in connection with the present invention. The coatings to which the mica of the invention are added must be cured or burnt at about 50° F. higher than prescribed for the coating compositions alone.

The invention both as to its organization and its method of operation together with additional objects and advantages thereof will best be understood from the following description of specific embodiments thereof.

*Example 1*

The metal surface to be coated is prepared in the customary way as by sand blasting, acid pickling, etc. Thereafter, a coating in the form of a slip, the solid constituents of which consist of 100 parts commercial, ground-coat, enamel frit
25 parts alumina (calcined)
5 parts enameler's clay, and
Citric acid crystals (added for setting up purposes), is applied by spraying, dipping or any other conventional method. After the coating slip is applied to the article and before burning the coating thereon, mica of 65 mesh or larger flake size is dusted onto the article, an excess of the mica being left on the surface. The article is then fast dried and fired at 50° F. above the normal firing temperature of the coating composition or at approximately 1750° F. to 1850° F. according to the base metal gage.

After cooling the surplus mica is removed with an air blast. A small amount of uncemented or loose mica usually remains but this loose mica is further cemented onto the article when the article is used in its high temperature application.

*Example 2*

The process is conducted as in Example 1 except that water ground mica of 100 mesh size is employed. Water-ground mica produces a product of greater sheen than the dry ground product since the particles which are water ground have sharper edges.

*Example 3*

The piece to be coated is prepared as before and a high temperature resistant ceramic coating such as set forth in Example 1 is applied dried and fired onto the said piece. A separate slip is made up of the following components.

95% glass frit
5% clay
Water to provide a slip.

This slip is applied in a layer 1 mil (.001") or less in thickness to the coated piece. Before this slip is dry, mica flakes or ground mica is dusted onto the piece and the said piece is fired, cooled, air blasted, etc. as in Example 1.

Any frit may be employed in the above described slip, for example, a frit made up of

|  | Percent |
|---|---|
| Feldspar | 19.9 |
| Quartz | 34.7 |
| Borax | 21.8 |
| Soda ash | 11.2 |
| Sodium nitrate | 4.9 |
| Fluorspar | 5.4 |
| Lithium manganite | 2.1 |
|  | 100 | is very satisfactory.

*Example 4*

The process is conducted as in Example 3 except that instead of dusting mica onto the piece which has one fired ceramic coating and one slip coating over the fired coating, the mica is mixed with said slip used for the second coating.

Example 5

The process is conducted as in Example 4, except that a slip comprising ground mica suspended in isopropyl alcohol is applied as the second coating to the once ceramically coated article.

Example 6

A basic frit is made of the following compounds in the proportions disclosed.

| | Percent |
|---|---|
| Flint | 31.0 |
| Barium carbonate | 46.9 |
| Boric acid | 9.5 |
| Calcium carbonate | 5.15 |
| Zinc oxide | 4.15 |
| Hydrated alumina | 1.25 |
| Zirconium oxide | 2.05 |
| | 100.0 |

This coating is known as the NBS ceramic coating frit #332. These compounds are mixed, melted, quenched, and dried. A coating composition is then formed by milling the following ingredients.

70 parts of above described frit
30 parts of chromic oxide (as recommended by NBS), and
6–15 parts of mica
    5% of total dry weight of enameler's clay water to produce a slip of approximately 1.75 specific gravity.

This coating is applied to the properly prepared metal piece and partially dried whereupon mica is dusted on to the piece and the firing and further treatment is carried out as in Example 1.

Example 7

The process is conducted as in Example 6 except that in making the slip the 30 parts of chromic oxide are replaced by zirconium oxide or by titanium oxide.

Example 8

The process is conducted as in Example 6 or 7 except that in place of dusting mica onto the slip coated piece, the said slip coated piece is first fired and thereafter a mica slip comprising 15% of mica and 5% of clay is coated on the product and this coating is fired thereon.

Example 9

The process is conducted as in any one of Examples 3–8 but similar additional layers of mica containing coatings are applied to the pieces produced by said Examples 3–8.

The features and principles underlying the invention described above in connection with specific exemplifications will suggest to those skilled in the art many other modifications thereof.

We claim:

1. In the process of providing a metal article with a high temperature resistant coating the steps comprising coating said metal object with a slip of a high temperature resistant, ceramically maturable vitreous enamel composition, incorporating mica particles into the surface region of the coating of the thus coated metal object prior to completing the drying of the applied slip, drying the slip and firing the ceramic composition at a temperature of the order of 50° F. higher than the normal maturing temperature of such ceramic composition whereby to provide a vitreous enamel coating containing mica particles at least partially embedded therein.

2. In the process of providing a metal article with a high temperature resistant coating the steps comprising coating said metal object with a slip of a high temperature resistant, ceramically maturable vitreous enamel composition of the type comprising an oxide selected from the group consisting of chromic oxide, titanium oxide, zirconium oxide and mixtures thereof as an essential ingredient in proportions of from 15 to about 30%, incorporating mica particles into the surface region of the coating of the thus coated metal object prior to completing the drying of the applied slip, drying the slip and firing the ceramic composition at a temperature of the order of 50° F. higher than the normal maturing temperature of such ceramic composition whereby to provide a vitreous enamel coating containing mica particles at least partially embedded therein.

3. A high temperature resistant article comprising a metal base portion having relatively low temperature resistance, a ceramically matured high temperature resistant vitreous enamel coating on said metal base, and a multiplicity of mica particles incorporated and fused into the surface region of said coating.

4. A high temperature resistant article comprising a metal base portion having relatively low temperature resistance, a ceramically matured high temperature resistant vitreous enamel coating on said metal base of the type comprising an oxide selected from the group consisting of chromic oxide, titanium oxide, zirconium oxide and mixtures thereof as an essential ingredient in proportions of 15 to 35%, and a multiplicity of mica particles incorporated and fused into the surface region of said coating.

References Cited in the file of this patent

UNITED STATES PATENTS

| | | |
|---|---|---|
| 250,465 | Vollrath | Dec. 6, 1881 |
| 1,200,041 | Speed | Oct. 3, 1916 |
| 1,286,043 | McCulloch | Nov. 26, 1918 |
| 1,896,041 | Ruben | Jan. 31, 1933 |
| 2,032,239 | White | Feb. 25, 1936 |
| 2,292,369 | Gordon | Aug. 11, 1942 |
| 2,327,972 | Stettinius et al. | Aug. 24, 1943 |
| 2,450,327 | Cogan et al. | Sept. 28, 1948 |